US010718215B2

(12) United States Patent
Warikoo et al.

(10) Patent No.: US 10,718,215 B2
(45) Date of Patent: Jul. 21, 2020

(54) AIRFOIL WITH STEPPED SPANWISE THICKNESS DISTRIBUTION

(71) Applicant: PRATT & WHITNEY CANADA CORP., Longueuil (CA)

(72) Inventors: Raman Warikoo, Oakville (CA); Krishna Prasad Balike, Mississauga (CA); Keegan Lobo, Mississauga (CA); Hien Duong, Mississauga (CA); Thomas Veitch, Scarborough (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 131 days.

(21) Appl. No.: 15/808,060

(22) Filed: Nov. 9, 2017

(65) Prior Publication Data

US 2018/0066522 A1 Mar. 8, 2018

Related U.S. Application Data

(63) Continuation of application No. 14/553,119, filed on Nov. 25, 2014, now Pat. No. 9,845,684.

(51) Int. Cl.
*F01D 5/14* (2006.01)
*F01D 9/04* (2006.01)
*F04D 29/32* (2006.01)

(52) U.S. Cl.
CPC .............. *F01D 5/141* (2013.01); *F01D 9/041* (2013.01); *F04D 29/324* (2013.01);
(Continued)

(58) Field of Classification Search
CPC ........ F01D 5/141; F01D 9/041; F04D 29/324; F05D 2220/32; F05D 2240/12; F05D 2240/30; F05D 2240/301; F05D 2250/292
(Continued)

(56) References Cited

U.S. PATENT DOCUMENTS 1,353,710 A * 9/1920 Baumann ................ F01D 5/141
416/237
2,355,413 A * 8/1944 Blcomberg ............. F01D 5/141
114/20.2
(Continued)

FOREIGN PATENT DOCUMENTS

EP 2423436 2/2012
GB 905911 A * 9/1962 ......... B64C 29/0025
WO WO2014016084 1/2014

OTHER PUBLICATIONS

Basic Concepts and Definitions E.L. Houghton, . . . Daniel T. Valentine, in Aerodynamics for Engineering Students (Sixth Edition), 2013 (Year: 2013).*

*Primary Examiner* — Woody A Lee, Jr.
*Assistant Examiner* — Brian Christopher Delrue
(74) *Attorney, Agent, or Firm* — Norton Rose Fulbright Canada LLP

(57) ABSTRACT

An airfoil for a gas turbine engine comprises at least three successive sections defined between a root and a tip. A first decrease of maximum thickness-to-chord ratios defined by a difference between a maximum thickness-to-chord ratio at the root and a maximum thickness-to-chord ratio at a first spanwise position, a second decrease of the maximum thickness-to-chord ratios defined by a difference between the maximum thickness-to-chord ratio at the first spanwise position and a maximum thickness-to-chord ratio at a second spanwise position, a third decrease of the maximum thickness-to-chord ratios defined by a difference between the maximum thickness-to-chord ratio at the second spanwise position and a maximum thickness-to-chord ratio at the tip, the second decrease being greater than the corresponding first and third decreases.

19 Claims, 9 Drawing Sheets

(52) U.S. Cl.
CPC ...... *F05D 2220/32* (2013.01); *F05D 2240/12* (2013.01); *F05D 2240/30* (2013.01); *F05D 2240/301* (2013.01); *F05D 2250/292* (2013.01)

(58) Field of Classification Search
USPC .......................................................... 415/193
See application file for complete search history.

(56) References Cited

U.S. PATENT DOCUMENTS

| | | | | |
|---|---|---|---|---|
| 2,663,493 A * | 12/1953 | Keast | ................... | F01D 5/141 415/199.5 |
| 2,700,935 A * | 2/1955 | Teague, Jr. | ............... | F01D 5/141 277/366 |
| 2,709,052 A * | 5/1955 | Berg | ..................... | B64C 3/14 244/35 R |
| 2,714,499 A * | 8/1955 | Warner | ................... | F01D 5/20 416/243 |
| 3,044,746 A * | 7/1962 | Stargardter | ............... | F01D 5/16 29/889.7 |
| 3,536,417 A * | 10/1970 | Merkle | ................. | F04D 29/284 415/119 |
| 3,989,406 A * | 11/1976 | Bliss | ..................... | F01D 5/141 415/1 |
| 4,168,939 A * | 9/1979 | Schmitz | ............... | B64C 27/463 415/119 |
| 4,431,376 A * | 2/1984 | Lubenstein | ............. | F01D 5/141 416/223 A |
| 4,730,985 A * | 3/1988 | Rothman | ............... | B64C 11/18 416/228 |
| 4,919,593 A * | 4/1990 | Brown | .................... | F01D 5/16 29/889.7 |
| 4,941,803 A * | 7/1990 | Wainauski | .............. | B64C 11/18 244/35 R |
| 4,961,686 A * | 10/1990 | Blair | ..................... | B23P 6/002 415/181 |
| 5,031,313 A * | 7/1991 | Blair | ..................... | B23P 6/002 29/402.06 |
| 5,088,894 A * | 2/1992 | Patel | ..................... | F01D 5/141 416/219 R |
| 5,160,242 A * | 11/1992 | Brown | .................... | F01D 5/20 416/193 A |
| 5,203,676 A * | 4/1993 | Ferleger | ................. | F01D 5/141 416/191 |
| 5,267,834 A * | 12/1993 | Dinh | ...................... | F01D 5/141 416/191 |
| 5,286,168 A * | 2/1994 | Smith | ..................... | F01D 5/16 416/193 A |
| 5,480,285 A * | 1/1996 | Patel | ..................... | F01D 5/141 416/223 A |
| 5,525,038 A * | 6/1996 | Sharma | .................. | F01D 5/141 416/223 A |
| 5,843,354 A * | 12/1998 | Evans | .................... | B29C 70/345 264/136 |
| 5,939,006 A * | 8/1999 | Wang | ................. | B29D 99/0025 264/257 |
| 6,071,077 A * | 6/2000 | Rowlands | ............... | F01D 5/141 416/223 A |
| 6,428,281 B1 * | 8/2002 | Botrel | ................... | F01D 5/145 416/223 A |
| 6,503,058 B1 * | 1/2003 | Selig | ..................... | F03D 1/0641 416/223 R |
| 6,579,066 B1 * | 6/2003 | Saito | ...................... | F01D 5/141 416/243 |
| 6,682,306 B2 * | 1/2004 | Murakami | ............... | F01D 5/141 416/189 |
| 7,108,486 B2 * | 9/2006 | Talbotec | ................. | F01D 5/141 416/223 A |
| 7,179,058 B2 * | 2/2007 | Chandraker | ............ | F01D 5/141 416/223 A |
| 7,517,193 B2 * | 4/2009 | Higashimori | ........... | F04D 21/00 416/185 |
| 8,047,802 B2 * | 11/2011 | Clemen | .................. | F01D 5/141 416/238 |
| 8,911,215 B2 * | 12/2014 | Cornelius | ............... | F01D 5/141 416/242 |
| 9,046,111 B2 * | 6/2015 | Harvey | .................. | F04D 29/324 |
| 9,650,896 B2 * | 5/2017 | Pesteil | .................... | F01D 5/141 |
| 9,845,684 B2 * | 12/2017 | Warikoo | ................. | F01D 5/141 |
| 10,233,758 B2 * | 3/2019 | Duong | ..................... | F01D 5/14 |
| 10,280,756 B2 * | 5/2019 | Nash | ....................... | F01D 5/141 |
| 10,309,236 B2 * | 6/2019 | Power | ...................... | F01D 9/02 |
| 2002/0178725 A1 * | 12/2002 | Dev | ........................ | F02C 3/045 60/723 |
| 2003/0228225 A1 * | 12/2003 | Saito | ..................... | F01D 5/141 416/235 |
| 2005/0220625 A1 * | 10/2005 | Chandraker | ............ | F01D 5/141 416/223 R |
| 2005/0249600 A1 * | 11/2005 | Kakishita | ................ | B63B 9/002 416/223 R |
| 2007/0081898 A1 * | 4/2007 | Matsuda | .................. | F01D 5/145 416/193 A |
| 2007/0140837 A1 * | 6/2007 | Guemmer | ................ | F01D 5/141 415/160 |
| 2007/0248463 A1 * | 10/2007 | Bogue | ..................... | F01D 5/005 416/219 R |
| 2008/0056901 A1 * | 3/2008 | Mah | ........................ | F01D 5/141 416/223 R |
| 2008/0265583 A1 * | 10/2008 | Thompson | ............... | F01D 5/141 290/54 |
| 2009/0047134 A1 * | 2/2009 | Chen | ....................... | F01D 5/141 416/223 R |
| 2009/0074574 A1 * | 3/2009 | Godsk | .................... | F03D 1/0641 416/41 |
| 2009/0169390 A1 * | 7/2009 | Nies | ........................ | F03D 1/065 416/223 A |
| 2010/0193644 A1 * | 8/2010 | Karem | ...................... | B64C 3/10 244/7 R |
| 2010/0278633 A1 * | 11/2010 | Duong | .................... | F04D 29/284 415/119 |
| 2011/0206500 A1 * | 8/2011 | Nagao | .................... | F01D 5/141 415/148 |
| 2011/0206527 A1 * | 8/2011 | Harvey | ................. | F04D 29/324 416/223 R |
| 2012/0020803 A1 * | 1/2012 | Lees | ..................... | F03D 7/0236 416/233 |
| 2013/0224031 A1 * | 8/2013 | Breeze-Stringfellow | ................... | B64C 11/18 416/223 R |
| 2014/0248154 A1 * | 9/2014 | Guemmer | .............. | F01D 5/141 416/223 A |
| 2014/0322028 A1 * | 10/2014 | Grohens | ................. | F01D 5/141 416/97 R |
| 2015/0086396 A1 * | 3/2015 | Nasir | ..................... | F01D 5/141 417/407 |
| 2015/0118059 A1 * | 4/2015 | Perrot | ..................... | F01D 5/14 416/238 |
| 2015/0204195 A1 * | 7/2015 | Klaus | ..................... | F01D 5/14 416/242 |
| 2015/0354365 A1 * | 12/2015 | Balzer | ..................... | F01D 5/02 416/95 |
| 2016/0053616 A1 * | 2/2016 | Scherrer | ................. | F02B 37/00 416/223 A |
| 2016/0184940 A1 * | 6/2016 | Hatano | .................... | B21K 3/04 29/889.23 |
| 2017/0175556 A1 * | 6/2017 | Soni | ....................... | F01D 9/041 |
| 2019/0101001 A1 * | 4/2019 | Nash | ....................... | F01D 5/141 |

* cited by examiner

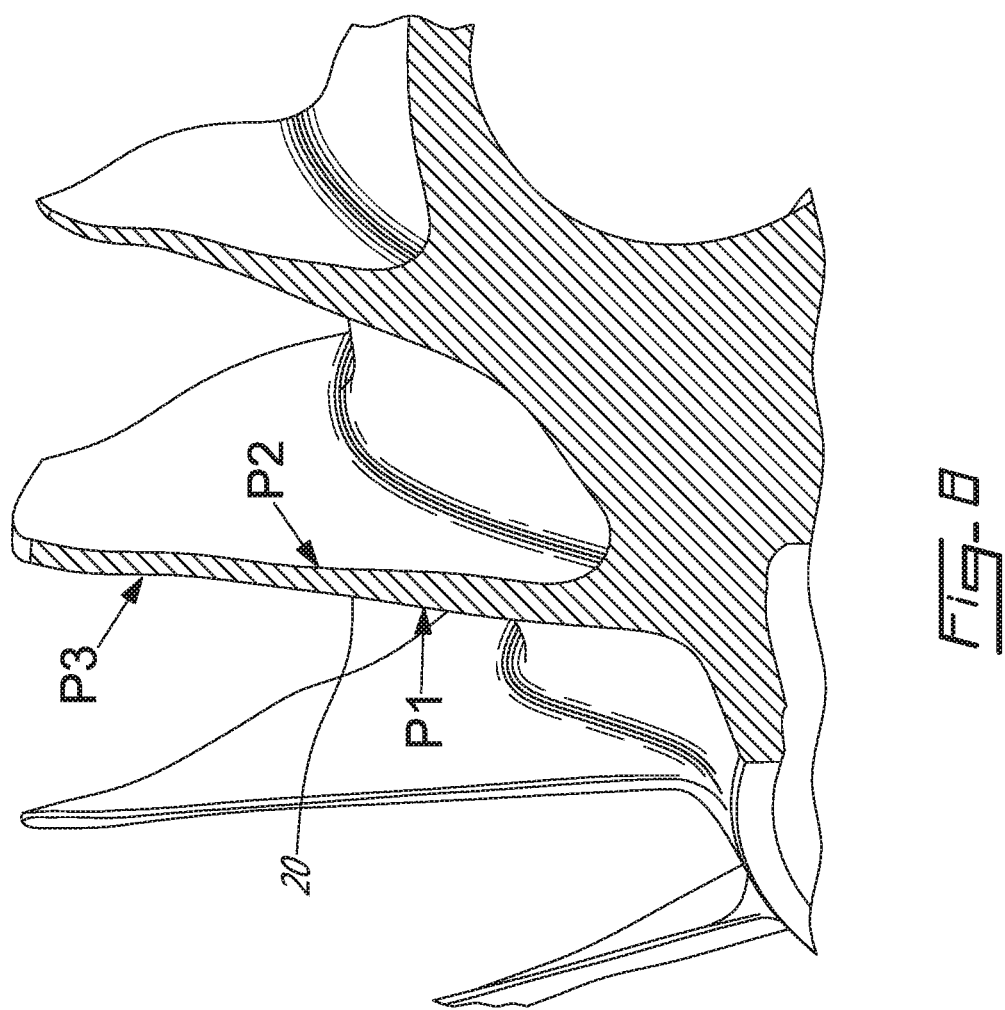

AIRFOIL WITH STEPPED SPANWISE THICKNESS DISTRIBUTION

CROSS REFERENCE TO RELATED APPLICATIONS

This application is a continuation of U.S. patent application Ser. No. 14/553,119 filed on Nov. 25, 2014, the content of which is hereby incorporated by reference.

TECHNICAL FIELD

The application relates generally to airfoils and, more particularly, to airfoils in a gas turbine engine.

BACKGROUND OF THE ART

Gas turbine engines include a plurality of rotors, including one or more compressor rotors. The rotors typically comprise a circumferential array of blades extending from a hub. The blades have an airfoil shaped portion, characterised by a pressure side, a suction side, a leading edge and a trailing edge. At high operating speeds, certain airfoils with unique features may deform in a way which may lead to a phenomenon called "closing". Closing at the leading edges of the blades may cause restricted air flow.

SUMMARY

In one aspect, there is provided an airfoil in a gas turbine engine, the airfoil comprising: opposed pressure and suction sides joined together at chordally opposite leading and trailing edges, the pressure and suction sides extending spanwise from a root to a tip of the airfoil, the airfoil having a spanwise distribution of maximum thicknesses of chordwise cross-sections of the airfoil, the spanwise distribution of the maximum thicknesses decreasing from the root to the tip, the spanwise distribution being stepped between a first portion extending from the root and a second portion extending to the tip.

In one aspect, there is provided an airfoil in a gas turbine engine, the airfoil comprising: opposed pressure and suction sides joined together at chordally opposite leading and trailing edges, the pressure and suction sides extending spanwise from a root to a tip of the airfoil; the airfoil having a spanwise distribution of maximum thicknesses of chordwise cross-sections of the airfoil, the spanwise distribution of maximum thicknesses having three portions, a first portion extending between 0 and about 33% of the span from the root, the first portion having a first slope, a second portion extending between about 33% and about 55% of the span starting from the root, the second portion having a second slope higher than the first slope, a third portion extending between about 55% and 100% of the span starting from the root, the third portion having a third slope higher than the first slope, the spanwise distribution having a marked transition at connections between the first, second, and third portions.

In one aspect, there is provided a gas turbine engine comprising: a plurality of rotors and a plurality of stators including each a plurality of blades disposed radially and having an airfoil portion, the airfoil portion of the blades of one of the plurality of stators and the plurality of rotors comprising: opposed pressure and suction sides joined together at chordally opposite leading and trailing edges, the pressure and suction sides extending spanwise from a root to a tip of the airfoil, the airfoil having a spanwise distribution of maximum thicknesses of chordwise cross-sections of the airfoil, the spanwise distribution of maximum thicknesses decreasing from the root to the tip, the spanwise distribution having a marked transition between a first portion extending from the root and a second portion extending to the tip.

In a further aspect, there is provided an airfoil for a gas turbine engine, the airfoil comprising opposite pressure and suction sides extending along a span of the airfoil from a root at 0 of the span to a tip at 1 of the span and extending along and joined together at chordally opposite leading and trailing edges, a spanwise distribution of maximum thickness-to-chord ratios between the root and the tip, each one of the maximum thickness-to-chord ratios represent a maximum thickness of the airfoil at a spanwise position normalised by a corresponding chord length at said spanwise position, the maximum thickness-to-chord ratios decreasing from the root to the tip; at least three successive sections defined between the root and the tip including a first section extending from the root to a first spanwise position along a first length, the first spanwise position disposed between the root and a mid-span position at 0.5 of the span, a second section extending from the first spanwise position to a second spanwise position along a second length, the second spanwise position disposed between the mid-span position and the tip, a third section extending from the second spanwise position to the tip along a third length, the second length being less than the first length and the third length, the third length being greater than the first length; and a first decrease of the maximum thickness-to-chord ratios defined by a difference between a maximum thickness-to-chord ratio at the root and a maximum thickness-to-chord ratio at the first spanwise position, a second decrease of the maximum thickness-to-chord ratios defined by a difference between the maximum thickness-to-chord ratio at the first spanwise position and a maximum thickness-to-chord ratio at the second spanwise position, a third decrease of the maximum thickness-to-chord ratios defined by a difference between the maximum thickness-to-chord ratio at the second spanwise position and a maximum thickness-to-chord ratio at the tip, the second decrease being greater than the corresponding first and third decreases.

In a further aspect, there is provided an airfoil for a gas turbine engine, the airfoil comprising opposite pressure and suction sides extending along a span of the airfoil from a root at 0 of the span to a tip at 1 of the span and extending along and joined together at chordally opposite leading and trailing edges, a spanwise distribution of maximum thickness-to-chord ratios between the root and the tip, each one of the maximum thickness-to-chord ratios represents a maximum thickness of the airfoil at a spanwise position normalised by a corresponding chord length at said spanwise position, the spanwise distribution of maximum thickness-to-chord ratios including a stepped segment between two successively adjacent segments of the airfoil, each one of the two successively adjacent segments extend along the span over a corresponding length and define a corresponding decrease of the maximum thickness-to-chord ratios along the corresponding length, the stepped segment extends over a stepped length and define a stepped decrease of the maximum thickness-to-chord ratios along the stepped length, the stepped length being less than any one of the corresponding lengths of the two successively adjacent segments, the stepped decrease is a maximum decrease of the maximum thickness-to-chord ratios along the span of the airfoil.

In a further aspect, there is provided an airfoil in a gas turbine engine, the airfoil comprising opposite pressure and suction sides extending along a span of the airfoil from a root at 0 of the span to a tip at 1 of the span and extending along and joined together at chordally opposite leading and trailing edges, a spanwise distribution of maximum thickness-to-chord ratios between the root and the tip, each one of the maximum thickness-to-chord ratios represents a maximum thickness of the airfoil at a spanwise position normalised by a corresponding chord length at said spanwise position, the spanwise distribution of the maximum thickness-to-chord ratios decreasing from the root to the tip, the spanwise distribution of the maximum thickness-to-chord ratios having a first portion extending from the root to at most 0.6 of the span and at least a second portion extending successively adjacent to the first portion towards the tip, the first portion having a first slope and the second portion having a second slope, the second slope being at least one order of magnitude higher than the first slope.

In a further aspect, there is provided a method of distributing a spanwise distribution of maximum thickness-to-chord ratios for an airfoil of a gas turbine engine, the method comprising decreasing the maximum thickness-to-chord ratios at a first average rate over a first section of the airfoil, the first section extending from a root to a first spanwise position along a span of the airfoil, the first section having a first length along the span; decreasing the maximum thickness-to-chord ratios at a second average rate greater than the first average rate over a second section extending successively along the span from the first spanwise position to a second spanwise position, the second section having a second length along the span passing through a mid-span position of the airfoil and being shorter than the first length; and decreasing the maximum thickness-to-chord ratios at a third average rate between the first and second average rates over a third section extending successively along the span from the second spanwise position to a tip, the third section having a third length along the span longer than the first length.

DESCRIPTION OF THE DRAWINGS

Reference is now made to the accompanying figures in which:

FIG. 8 shows a cross-section of the blade taken along lines 8-8 in FIG. 3.

DETAILED DESCRIPTION

Figure 1:
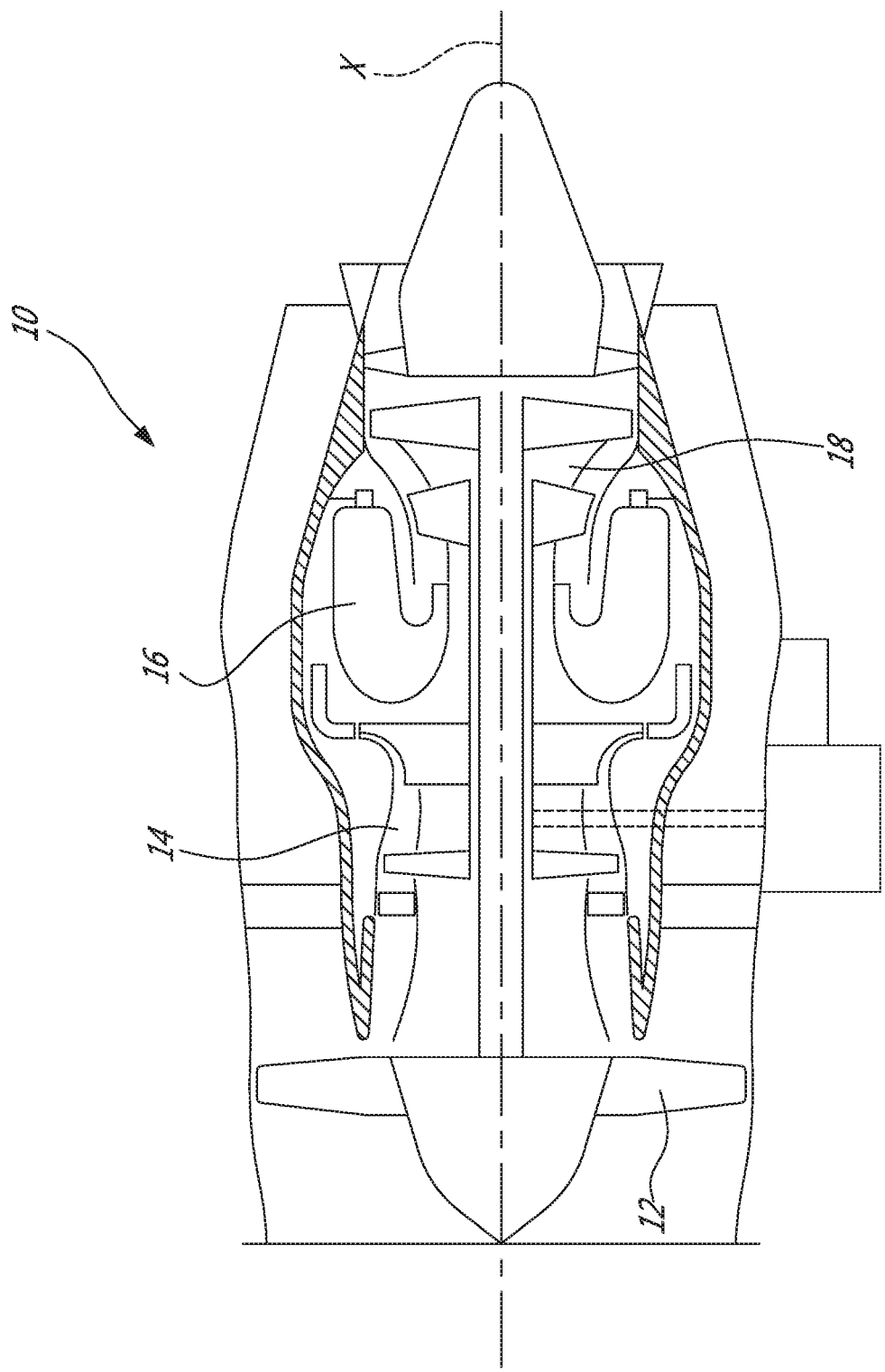
FIG. 1 is a schematic cross-sectional view of a gas turbine engine.

FIG. 1 illustrates a gas turbine engine 10 of a type preferably provided for use in subsonic flight, generally comprising in serial flow communication along a centerline axial axis X: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
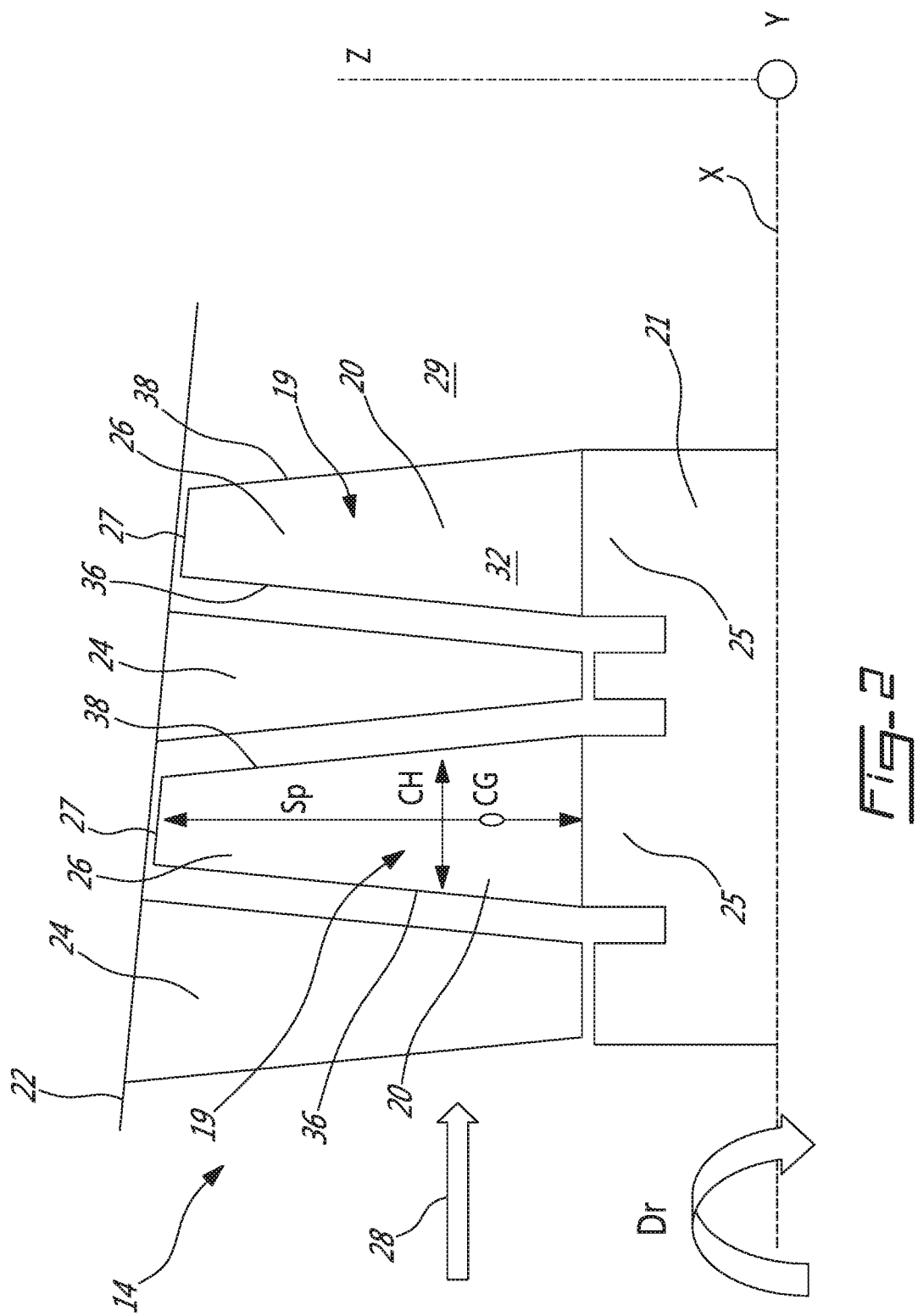
FIG. 2 is a schematic of a portion of a compressor of the gas turbine engine of FIG. 1.
Figure 3:
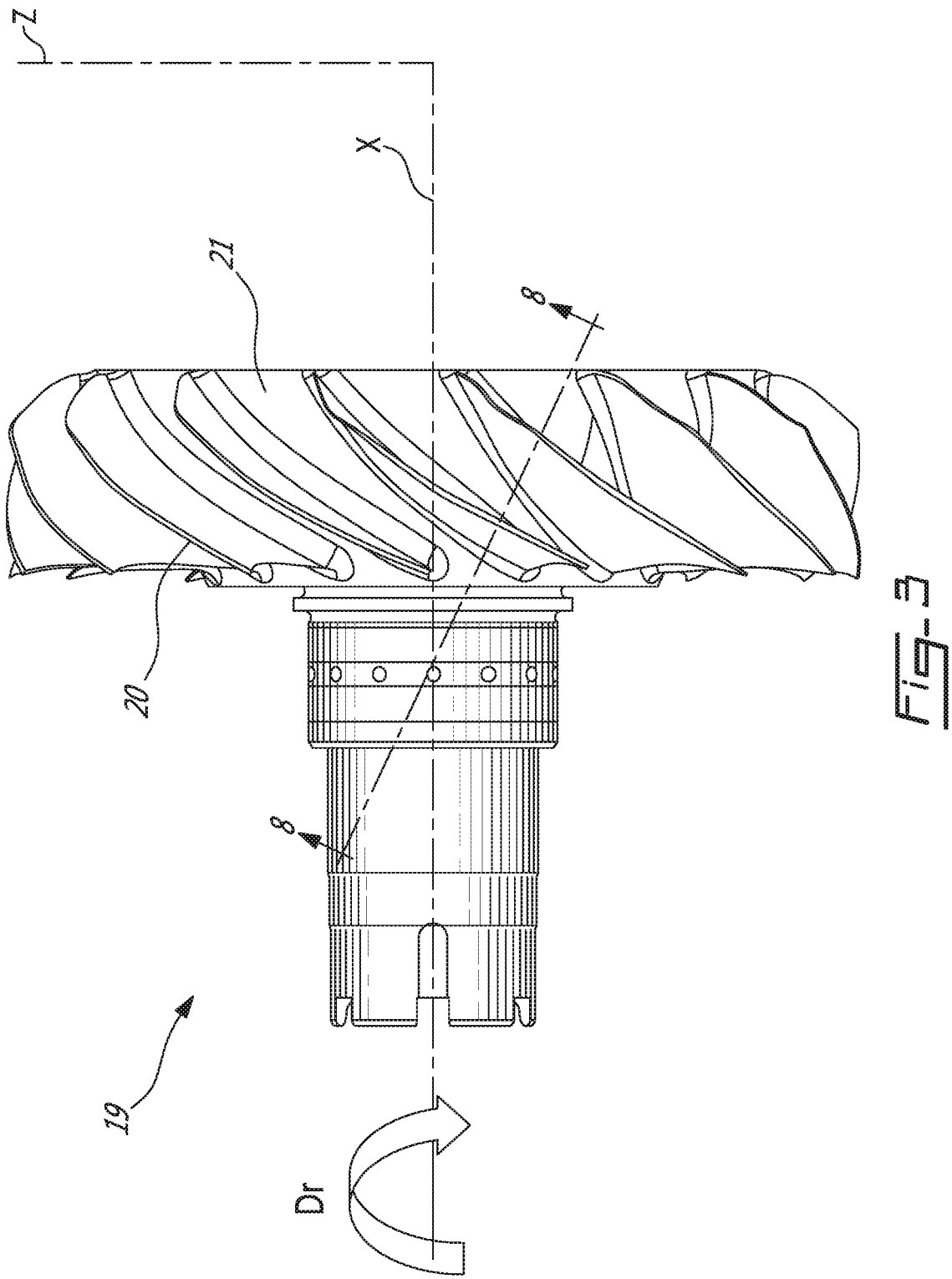
FIG. 3 is a schematic side elevation view of a rotor of the compressor of FIG. 2.

Referring now to FIGS. 2 and 3, a portion of the compressor section 14, shown in FIG. 2, includes a plurality of rotors 19 (only two of the rotors being shown). The rotor 19, best shown in FIG. 3, is an integrally bladed rotor including a plurality of circumferentially distributed blades 20 extending radially (axis Z) from an annular hub 21. The blades 20 could be integrally formed with the hub 21 (known as blisk) or could be connected thereto. The blades 20 are supported in a circumferentially extending row around hub 21 for rotation about the axial axis X of the engine 10 (as depicted by arrow Dr in FIG. 2). As shown in FIG. 2, an annular compressor casing 22 (also known as shroud) surrounds the compressor blades 20. The compressor section 14 also includes a plurality of circumferential rows or stages of stator vanes 24 disposed between the plurality of compressor blades 20 in an alternating fashion. The stator vanes 24 project radially inwardly from the compressor casing 22.

Each of the blades 20 includes a root 25 joining the blade 20 to the hub 21 and an airfoil portion 26 extending from the root 25. When the blades 20 are part of a blisk, the root 25 is integrated in the hub and the blade is equivalent to its airfoil portion. The airfoil portion 26 includes a tip 27 at a radially outer end thereof. The tip 27 is spaced radially from the compressor casing 22 to provide tip clearance. The hub 21 and annular casing 22 define inner and outer boundaries, respectively, for channeling a flow of air 28 through the compressor 14. The flow of air 28 is generally aligned with the axial axis X. The hub 21 forms with the compressor casing 22 a converging annular flow channel 29 for compressing air driven through the compressor section 14 by the blades 20. As such, the front blades 20 (i.e. the upstream stages of compressor blades) have a longer span Sp than the rear blades 20 (i.e. the downstream stages of compressor blades, the ones just upstream of the combustor 16).

The airfoil portions 26 of the blades 20 include each a pressure side 32 and an opposed suction side 34. The pressure side 32 and suction side 34 extend in a span direction from the root 25 to the tip 27. The airfoil portion 26 further includes a leading edge 36 and a trailing edge 38 defined at the junction of the pressure side 32 and the suction side 34. The airfoil portion 26 also defines the span Sp extending between the root 25 and the tip 27, and a chord Ch extending transversally between the leading edge 36 and the trailing edge 38. When in operation, the blade 20 rotates in the direction of rotation Dr with the suction side 34 disposed forward of the pressure side 32. When the blades 20 are in operation connected to the hub 21, the root 25 is commonly referred to as the hub 21.

Figure 4:
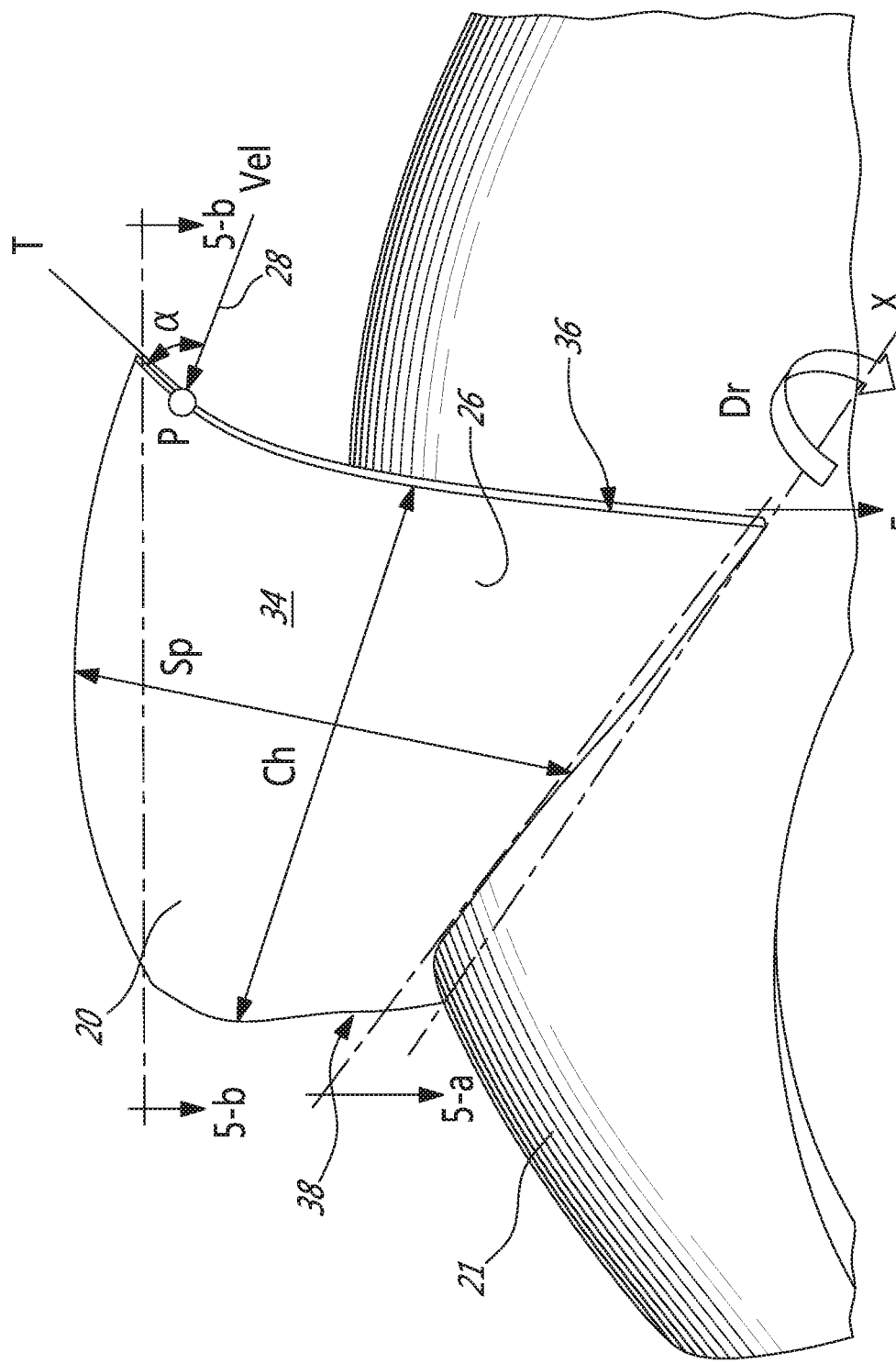
FIG. 4 is a schematic of a blade for the rotor of FIG. 3.

Turning to FIG. 4, the airfoil portion 26 may be oriented at different positions relative to the flow of air 28 in order to optimise efficiency of the rotor 19. Flow around the airfoil portion 26 is complex. Tip blade lean (in direction of rotation Dr) and forward sweep (in direction opposite to flow 28) may be used in the design of the blades 20 to improve performance and stall margin.

Having a blade that is swept forward may provide several benefits to the tip 27, including non-exclusively, reduced front loading, lower axial diffusion and less boundary layer accumulation. In addition, having an airfoil portion 26 that is leaned may also provide benefits to the tip 27.

As a result, a combination of sweep and blade lean may be adopted in some of the blades, such as the blade 20 described herein. However, sweeping of the blade 20 may cause high bending stresses in the blade root area and closing in running conditions. To reduce high blade root stresses, the blade 20 may have a characteristic stepped spanwise thickness distribution with a marked transition, which will now be described.

The blade 20 is only one example of blade which would have such characteristic spanwise thickness distribution. Other blades, which may not be leaned and/or swept may nonetheless have such stepped thickness distribution.

Figure 5:
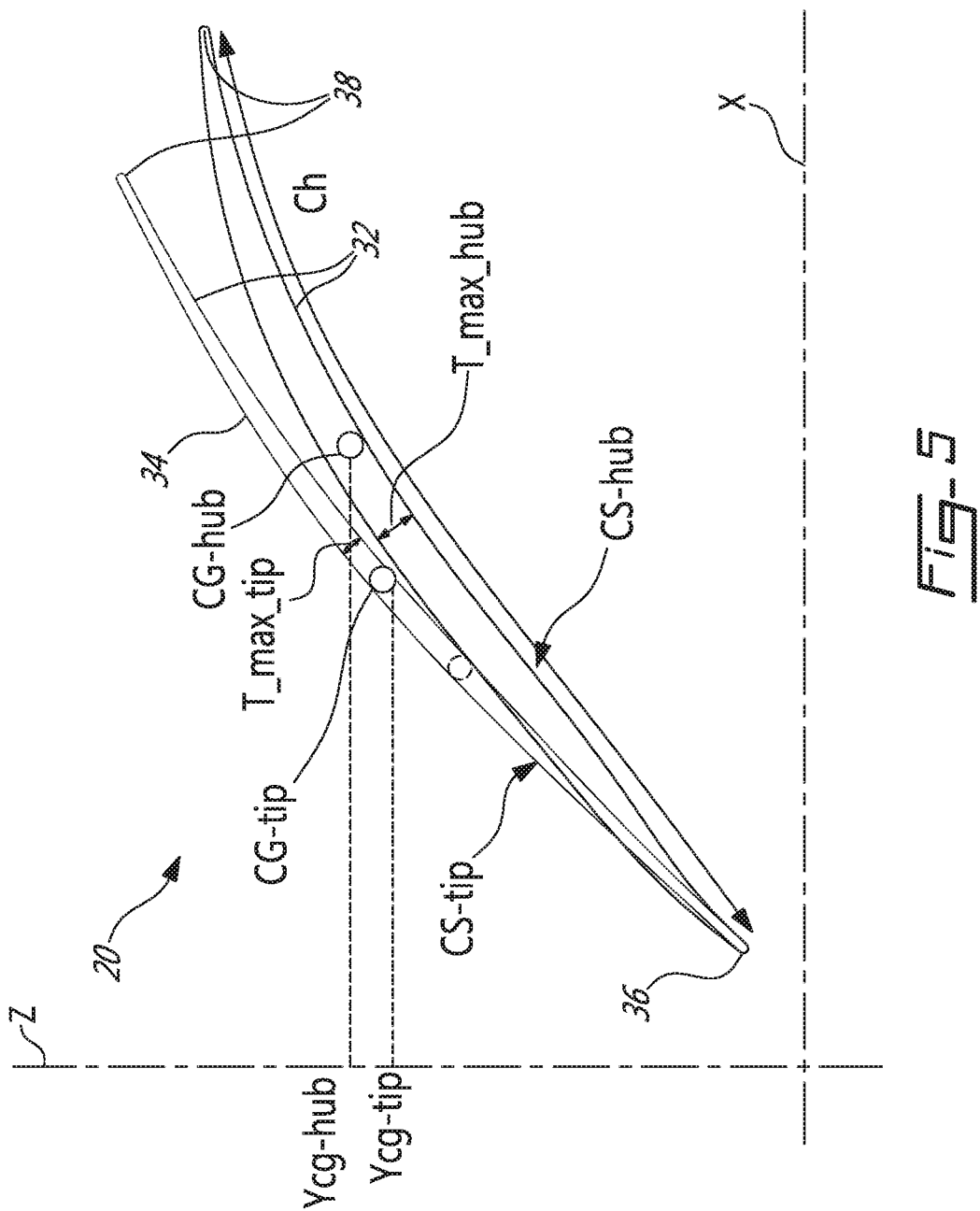
FIG. 5 is a schematic cross-sectional view of the blade of the compressor of FIG. 4 taken toward the hub along line 5a-5a superimposed with a schematic cross-sectional view taken toward the tip along line 5b-5b.

Turning now to FIG. 5, a schematic chordwise cross-section CS-hub of the airfoil portion 26 toward the hub 21 (taken along line 5b-5b in FIG. 4) is shown superimposed with a schematic cross-section CS-tip of the airfoil portion 26 toward the tip 27 (taken along line 5a-5a in FIG. 4). Each of the cross-sections CS-hub, CS-tip are taken along chords Ch of the airfoil portion 26 and have a corresponding center of gravity CG-hub, CG-tip, which has tangential coordinates Ycg-hub, Ycg-tip, respectively. Each of the cross-sections CS-hub, CS-tip has a maximum thickness T_max_hub, T_max_tip. The thicknesses are calculated in each cross-section as the distance between opposed points of the suction side 34 and the pressure side 32. The maximum thickness T_max is the largest thickness from all the local thicknesses defined between opposed points of the suction side 34 and the pressure side 32 in a given cross-section. The thicknesses are calculated in planes of the cross-sections, where each cross-section is defined along a blade streamline extending from the leading edge 36 and to trailing edge 38 (i.e. chordwise cross-sections). Chordwise location of the maximum thickness may vary from cross-section to cross-sections, but it is expected to be generally found within a 40-60% chord length calculated from the leading edge 36.

Figure 6:
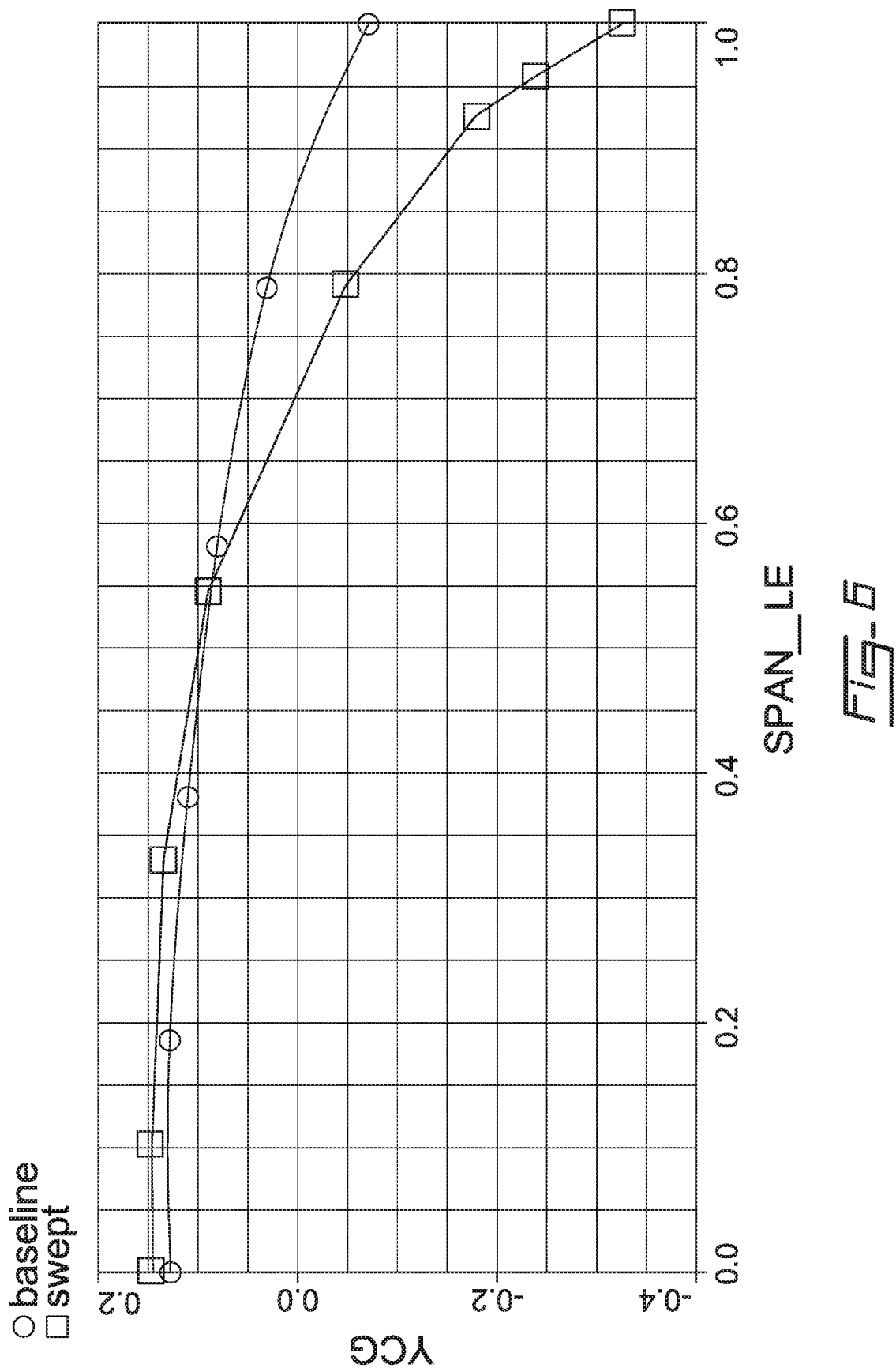
FIG. 6 is a graph of a tangential component Ycg of the center of gravity relative to a span Sp at the leading edge for a baseline blade and for the blade of the compressor of FIG. 2.

To appreciate one of the effects of a swept airfoil design onto the center of gravity CG of the cross-sections, the value of the Ycg along a span Sp at the leading edge 36 of the present airfoil 26 is illustrated in FIG. 6 with squares, relative to a baseline unswept airfoil, which is illustrated with circles. The Ycg of the present airfoil 26 changes value especially from mid-span to the tip 27 (variation between 0.15 and −0.35) while the baseline airfoil shows smaller changes in value (variation between 0.15 and −0.075). The mid-span to tip 27 variation of the Ycg may induce opening of the airfoil 26, when the airfoil 26 is rotating. In turn, the blade 20 may become imbalanced and experience increased stresses, especially at the hub 21. Closing at the leading edge 36 may also cause restricted air flow. Increase in stresses and side effects of the closing of the leading edge 36 may be decreased by having a particular repartition of the thickness of the airfoil 26. The particular partition of the thickness of the airfoil 26 will be described in greater details and includes a thickening toward the root 25 and a thinning toward the tip 27 with a visible marked transition of the thickness in between these two areas. This thickness distribution may stiffen the blade root and help reduce bending stresses while reducing the blade pull due to centrifugal loads as blade weight at higher radii exerts greater centrifugal pull at the root. The transition is herein qualified as stepped or marked to indicate a rapid, sudden change of curvature, which may be characterized by a sharp corner or angle, or a tight radius region of transition between the two areas.

Figure 7A:
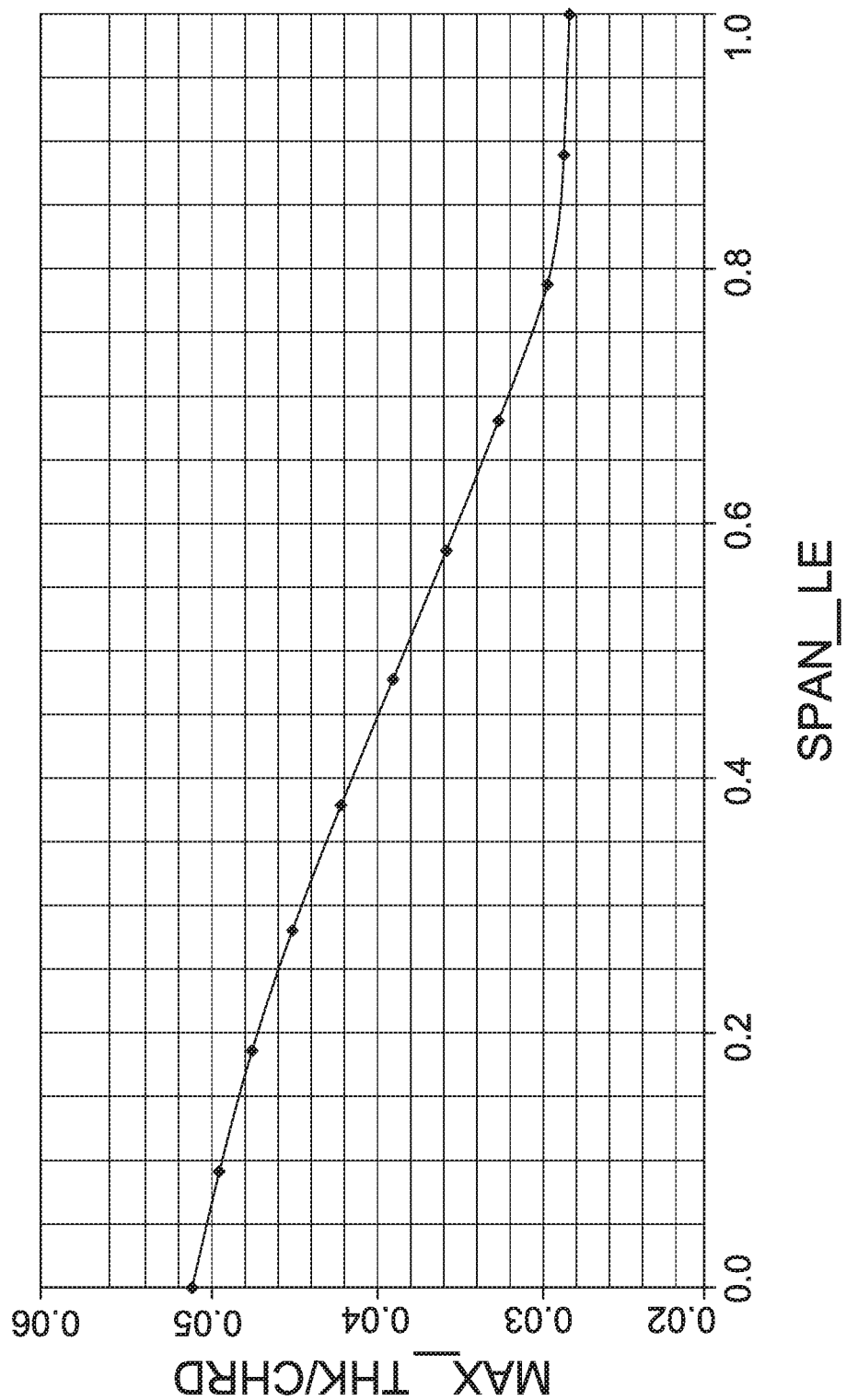
FIG. 7A is a plot of a maximum thickness (normalised by chord length) distribution along the span Sp at the leading edge (normalised between 0 and 1) for the baseline blade.
Figure 7B:
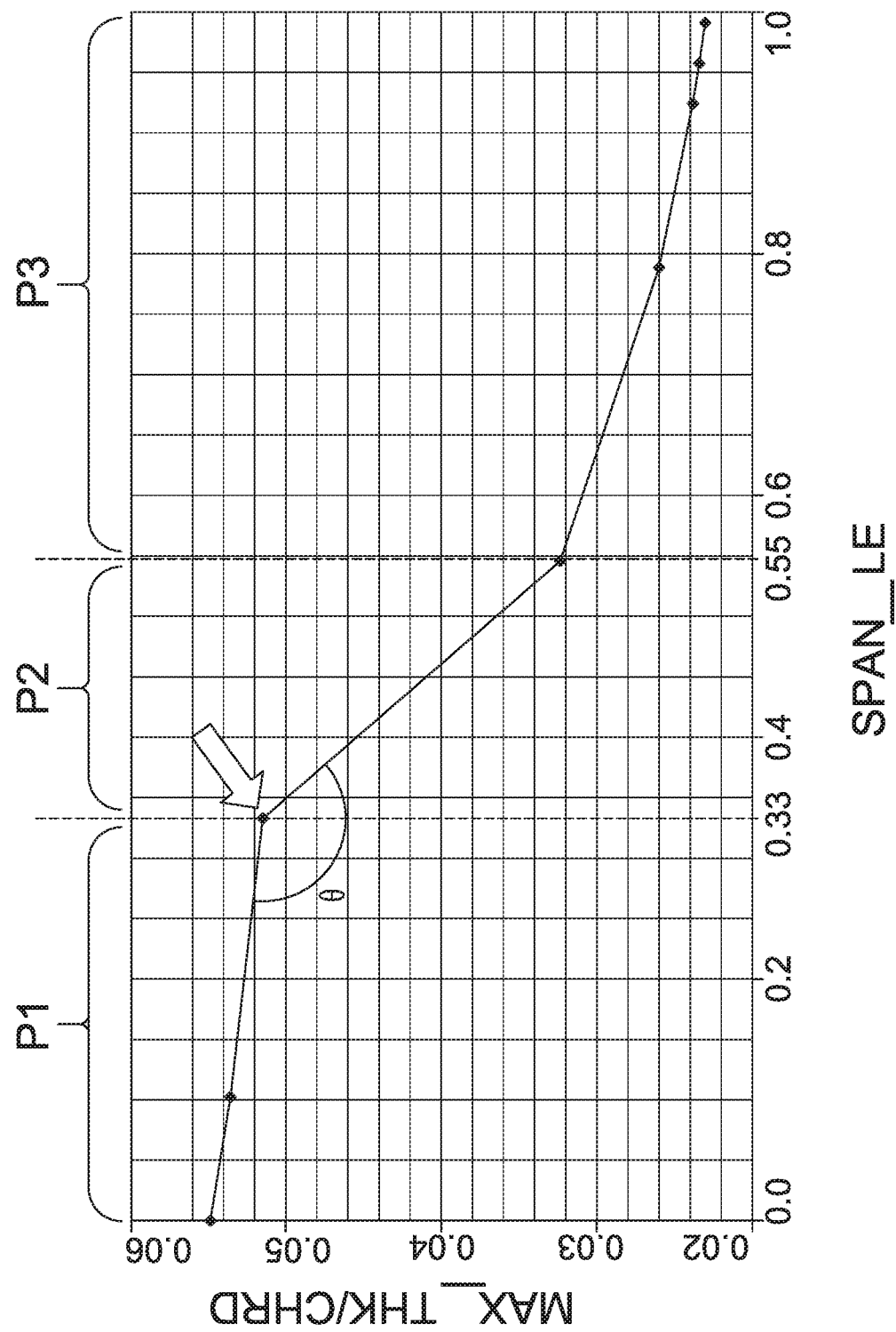
FIG. 7B is a plot of a maximum thickness (normalised by chord length) distribution along the span Sp at the leading edge (normalised between 0 and 1) for the blade of FIG. 2.

FIGS. 7A and 7B illustrate the maximum thickness T_max (normalised by a chord) distribution along the span Sp at the leading edge 36 (normalised between 0 and 1, 0 being at the root and 1 at the tip 27) of the baseline blade (FIG. 7A) and of the present blade 20 (FIG. 7B). The maximum thickness is one of the values that may be used to assess a repartition of the weight/thickness throughout the airfoil portion 26.

The maximum thickness T_max of the present blade 20 is characterised by a stepped spanwise distribution, i.e. a relatively abrupt change between two portions of the distribution along the span Sp. For a first portion P1 of the distribution (in the example of FIG. 7B, for a first third of the distribution, from the root at span=0 to about span=0.33), the maximum thickness T_max decreases slightly. The first portion P1 is generally linear, though it is contemplated that the first portion P1 could be slightly curved. The first portion P1 could extend up to 0.6 span.

For a second portion P2 of the distribution (in the example of FIG. 7B, from span=0.33 to about span=0.55), the maximum thickness T_max decreases strongly relative to the first portion P1. A change of slope between the first portion P1 and the second portion P2 can be characterised as abrupt. It is at least easy identifiable when one looks at the overall distribution of the maximum thickness. The abrupt transition is indicated by arrow 50 in FIG. 7B. The second portion P2 could be linear or curved.

For a third portion P3 (i.e. from span=0.55 to span=1), the maximum thickness T_max decreases gradually relative to the second portion P2. The third portion P3 may be linear or curved and more or less inclined relative to the first and the second portions P1, P2. The third portion P3 could extend from 0.3 up to 1.0 span.

In this embodiment, a slope of the second portion P2 is higher than a slope of the third portion P3, and a slope of the third portion P3 is higher than a slope of the first portion P1. In the particular embodiment shown in FIG. 7B, the slope of the first portion P1 is about −0.009, the slope of the second portion P2 is about −0.09, and the slope of the third portion P3 is about −0.02. Thus, the slope of the second portion P2 is about 10 times the slope of the first portion P1, and the slope of the third portion P3 is about twice the slope of the first portion P1. The slope of the second portion P2 has an order of magnitude one higher than that of the slope of the first portion P1. It is contemplated that the slope of the second portion P2 could have an order of magnitude more than one higher than that of the slope of the first portion P1. The slope of the third portion P3 has a same order of magnitude than that of the slope of the first portion P1. The first portion P1 forms an angle θ with the second portion P2. In the particular embodiment shown in FIG. 7B, the angle θ is about 120 degrees. FIG. 8 shows a cross-section of the blade 20 taken along lines 8-8 in FIG. 3, the cross-section allowing to visualise the portions P1, P2 and P3.

In terms of thicknesses, a maximum thickness at the tip 27 is about 0.023 (normalised) while a maximum thickness at the root 25 is about 0.055 (normalised). As such, the maximum thickness at the tip 27 is less than half a thickness of the maximum thickness at the root 25. More precisely, the maximum thickness at the tip 27 represents 41% of the maximum thickness at the root 25. In comparison, in the baseline blade (or airfoil), maximum thickness at the tip is about 0.028 (normalised) while a thickness at the root is about 0.051 (normalised), so the maximum thickness at the tip is more than half a thickness of the maximum thickness at the root. More precisely, the maximum thickness at the tip of the baseline blade represents 55% of the maximum thickness at the root of the baseline blade. The present airfoil is thus thinner in absolute value at the tip 27 relative to the baseline airfoil, but also in relative value relative to the root 25 compared to the baseline airfoil.

The exemplified airfoil 26 is characterised by a clear and abrupt change in the thickness distribution created by the second portion P2. The maximum thickness distribution of the airfoil portion 26 is thicker at the root 25, then abruptly thins, and thins even more toward the tip 27. In comparison, the maximum thickness of the baseline airfoil thins in a relatively monotonic manner from the root to the tip. In the baseline airfoil, there is no abrupt change of thickness. As a result, the present airfoil 26 has a repartition of the weight that is biased toward the root 25, at the expense of the tip 27 and with an abrupt transition starting at about ⅓ of the span Sp calculated from the root 25. While the embodiment in FIG. 7B shows three portions, it is contemplated that the maximum thickness distribution could have only two portions with one step. The second and third portions P2, P3 could for example form a single portion.

In a particular embodiment, there is provided a method of distributing a spanwise distribution of maximum thickness-to-chord ratios for an airfoil of a gas turbine engine, the method comprising decreasing the maximum thickness-to-chord ratios at a first average rate over a first section of the airfoil, the first section extending from a root to a first spanwise position along a span of the airfoil, the first section having a first length along the span; decreasing the maximum thickness-to-chord ratios at a second average rate greater than the first average rate over a second section extending successively along the span from the first spanwise position to a second spanwise position, the second section having a second length along the span passing through a mid-span position of the airfoil and being shorter than the first length; and decreasing the maximum thickness-to-chord ratios at a third average rate between the first and second average rates over a third section extending successively along the span from the second spanwise position to a tip.

The method can also include leaning centers of gravity of the airfoil in a direction of rotation of the airfoil along the span from the root to the tip. In an alternate embodiment, leaning the centers of gravity of the airfoil includes continuously leaning the centers of gravity from the root to the tip. The method can also include continuously decreasing the maximum thickness-to-chord ratios from the root to the tip. In a particular embodiment, the second average rate is greater than a sum of the first average rate and the third average rate. The third section can have a third length along the span longer than the first length.

The above description is meant to be exemplary only, and one skilled in the art will recognize that changes may be made to the embodiments described without departing from the scope of the invention disclosed. The shapes of the airfoils described herein could be used in high speed rotors as well as in low speed rotors. The above described airfoils could be used in rotors that are not part of a compressor section of a gas turbine engine, for example in turbines. The above described airfoils could be used in stators, particularly in stators with cantilevered inner or outer shrouds. The above described airfoils may allow extra thickness to be added at the root of the stator where stresses are typically high while keeping the rest of the stator at a more aerodynamically favorable thickness. Still other modifications which fall within the scope of the present invention will be apparent to those skilled in the art, in light of a review of this disclosure, and such modifications are intended to fall within the appended claims.

The invention claimed is:

1. An airfoil for use in a gas turbine engine, the airfoil securable to a hub for rotation about a central axis, the airfoil comprising:

opposite pressure and suction sides extending along a span of the airfoil from a root at 0 of the span to a tip at 1 of the span and extending along and joined together at chordally opposite leading and trailing edges, a spanwise distribution of maximum thickness-to-chord ratios between the root and the tip, each one of the maximum thickness-to-chord ratios represents a maximum thickness of the airfoil at a spanwise position normalised by a corresponding chord length at said spanwise position, both of the leading edge and the trailing edge extending mainly in a radial direction relative to the central axis;

at least three successive sections defined between the root and the tip including a first section extending from the root to a first spanwise position along a first length, the first spanwise position disposed between the root and a mid-span position, a second section extending from the first spanwise position to a second spanwise position along a second length, the second spanwise position disposed between the mid-span position and the tip, a third section extending from the second spanwise position to the tip along a third length, the second length being less than the first length and the third length; and a first decrease of the maximum thickness-to-chord ratios defined by a difference between a maximum thickness-to-chord ratio at the root and a maximum thickness-to-chord ratio at the first spanwise position, a second decrease of the maximum thickness-to-chord ratios defined by a difference between the maximum thickness-to-chord ratio at the first spanwise position and a maximum thickness-to-chord ratio at the second spanwise position, a third decrease of the maximum thickness-to-chord ratios defined by a difference between the maximum thickness-to-chord ratio at the second spanwise position and a maximum thickness-to-chord ratio at the tip, the second decrease being greater than the corresponding first and third decreases.

2. The airfoil as defined in claim 1, comprising a tangential lean of centers of gravity of the airfoil in a direction of rotation of the airfoil along the span from the root to the tip.

3. The airfoil as defined in claim 1, wherein the maximum thickness-to-chord ratios continuously decrease from the root to the tip.

4. The airfoil as defined in claim 1, wherein the third decrease is greater than the first decrease.

5. The airfoil as defined in claim 1, wherein the third length is greater than the first length.

6. The airfoil as defined in claim 1, wherein the second decrease is greater than a sum of the first decrease and the third decrease.

7. The airfoil as defined in claim 1, wherein the maximum thickness-to-chord ratios decreasing from the root to the tip and define a first average slope in the first section, a second average slope in the second section and third average slope in the third section, the second average slope is greater than the first average slope and the third average slope.

8. The airfoil as defined in claim 1, wherein the second decrease is at least 0.01 and the second length is at least 0.1 of the span.

9. The airfoil as defined in claim 1, wherein the third length is at least 0.4 of the span.

10. A rotor for a gas turbine engine, the rotor comprising:
a plurality of blades disposed radially, at least one of the plurality of blades having an airfoil as defined in claim 1.

11. A gas turbine engine comprising:
a plurality of rotors and a plurality of stators, at least one of the plurality of rotors and the plurality of stators including an airfoil as defined in claim 1.

12. An airfoil for use in a gas turbine engine, the airfoil securable to a hub for rotation about a central axis, the airfoil comprising:
opposite pressure and suction sides extending along a span of the airfoil from a root at 0 of the span to a tip at 1 of the span and extending along and joined together at chordally opposite leading and trailing edges, both of the leading edge and the trailing edge extending mainly in a radial direction relative to the central axis, a spanwise distribution of maximum thickness-to-chord ratios between the root and the tip, each one of the maximum thickness-to-chord ratios represents a maximum thickness of the airfoil at a spanwise position normalised by a corresponding chord length at said spanwise position, the spanwise distribution of maximum thickness-to-chord ratios including a stepped segment between two successively adjacent segments of the airfoil, each one of the two successively adjacent segments extend along the span over a corresponding length and define a corresponding decrease of the maximum thickness-to-chord ratios along the corresponding length, the stepped segment extends over a stepped length and define a stepped decrease of the maximum thickness-to-chord ratios along the stepped length, the stepped length being less than any one of the corresponding lengths of the two successively adjacent segments, the stepped decrease is a maximum decrease of the maximum thickness-to-chord ratios along the span of the airfoil.

13. The airfoil as defined in claim 12, wherein the maximum decrease is at least greater than a sum of the corresponding decreases of the two successively adjacent segments.

14. The airfoil as defined in claim 12, wherein the stepped length is 0.22 of the span and the stepped decrease is at least 0.01.

15. An airfoil for use in a gas turbine engine, the airfoil securable to a hub for rotation about a central axis, the airfoil comprising:
opposite pressure and suction sides extending along a span of the airfoil from a root at 0 of the span to a tip at 1 of the span and extending along and joined together at chordally opposite leading and trailing edges, both of the leading edge and the trailing edge extending mainly in a radial direction relative to the central axis, a spanwise distribution of maximum thickness-to-chord ratios between the root and the tip, each one of the maximum thickness-to-chord ratios represents a maximum thickness of the airfoil at a spanwise position normalised by a corresponding chord length at said spanwise position,
the spanwise distribution of the maximum thickness-to-chord ratios having a first portion extending from the root to at most 0.6 of the span and at least a second portion extending successively adjacent to the first portion towards the tip, the first portion having a first slope and the second portion having a second slope, the second slope being at least one order of magnitude higher than the first slope.

16. The airfoil as defined in claim 15, wherein the second slope is 10 times higher than the first slope.

17. The airfoil as defined in claim 15, wherein the first portion extends between 0 and at least 0.2 of the span of the airfoil calculated from the root.

18. The airfoil as defined in claim 15, wherein the spanwise distribution comprises a third portion extending to the tip, the second portion being disposed spanwise between the first portion and the third portion, the third portion having a third slope smaller than the second slope.

19. The airfoil as defined in claim 18, wherein a length of the first portion is 0.33 of the span, a length of the second portion is 0.22 of the span, and a length of the third portion is 0.45 of the span.

* * * * *